United States Patent [19]
Ching et al.

[11] Patent Number: 5,624,608
[45] Date of Patent: Apr. 29, 1997

[54] DEVICE FOR SPRAYING, IN PARTICULAR WATER IN THE FORM OF MICRODROPLETS, CAPABLE OF FUNCTIONING IN A NONSTATIONARY ENVIRONMENT

[75] Inventors: Gil Ching, Cagnes sur Mer; Anne Giovanini, Valbonne; Daniel Guyomar, Nice; Jean-Denis Sauzade, Grasse; Georges Fonzes, Antibes; Michel Gschwind, Grasse; Jean Lauretti, Le Cannet, all of France

[73] Assignee: IMRA Europe SA, Valbonne, France

[21] Appl. No.: 497,476

[22] Filed: Jun. 30, 1995

[30] Foreign Application Priority Data

Jul. 4, 1994 [FR] France .................. 94 08204

[51] Int. Cl.⁶ ............................................. B01F 3/04
[52] U.S. Cl. .................. 261/30; 261/81; 261/DIG. 48; 239/102.2
[58] Field of Search ............... 261/DIG. 48, 81, 261/30; 239/102.2

[56] References Cited

U.S. PATENT DOCUMENTS

| | | | |
|---|---|---|---|
| 3,211,088 | 10/1965 | Naiman | 239/102.2 |
| 4,238,425 | 12/1980 | Matsuoka et al. | 261/81 |
| 4,410,139 | 10/1983 | Nishikawa et al. | 261/DIG. 48 |
| 4,834,124 | 5/1989 | Honda | 239/102.2 |
| 5,020,636 | 6/1991 | Daeges | 239/102.2 |
| 5,170,782 | 12/1992 | Kocinski | 261/DIG. 48 |

FOREIGN PATENT DOCUMENTS

| | | | |
|---|---|---|---|
| 0571316 | 11/1993 | European Pat. Off. | |
| 2655279 | 6/1991 | France | |
| 2690510 | 10/1993 | France | 261/DIG. 48 |
| 3734905 | 5/1989 | Germany | |
| 0034943 | 4/1981 | Japan | 261/DIG. 48 |

Primary Examiner—Tim R. Miles
Attorney, Agent, or Firm—Oliff & Berridge

[57] ABSTRACT

The invention relates to a spraying device including a tank which is open at its upper part, capable of containing a liquid to be sprayed, such as water, while being filled up to its opening, a piozoelectric element capable of emitting waves into the liquid and fan means for creating a circulation of air in the vicinity of the surface of the liquid. The waves are focused in the vicinity of the opening of the tank, and the cross-section of the tank (1) has a progressive constriction towards the opening (2) of the tank (1).

4 Claims, 1 Drawing Sheet

FIG_1
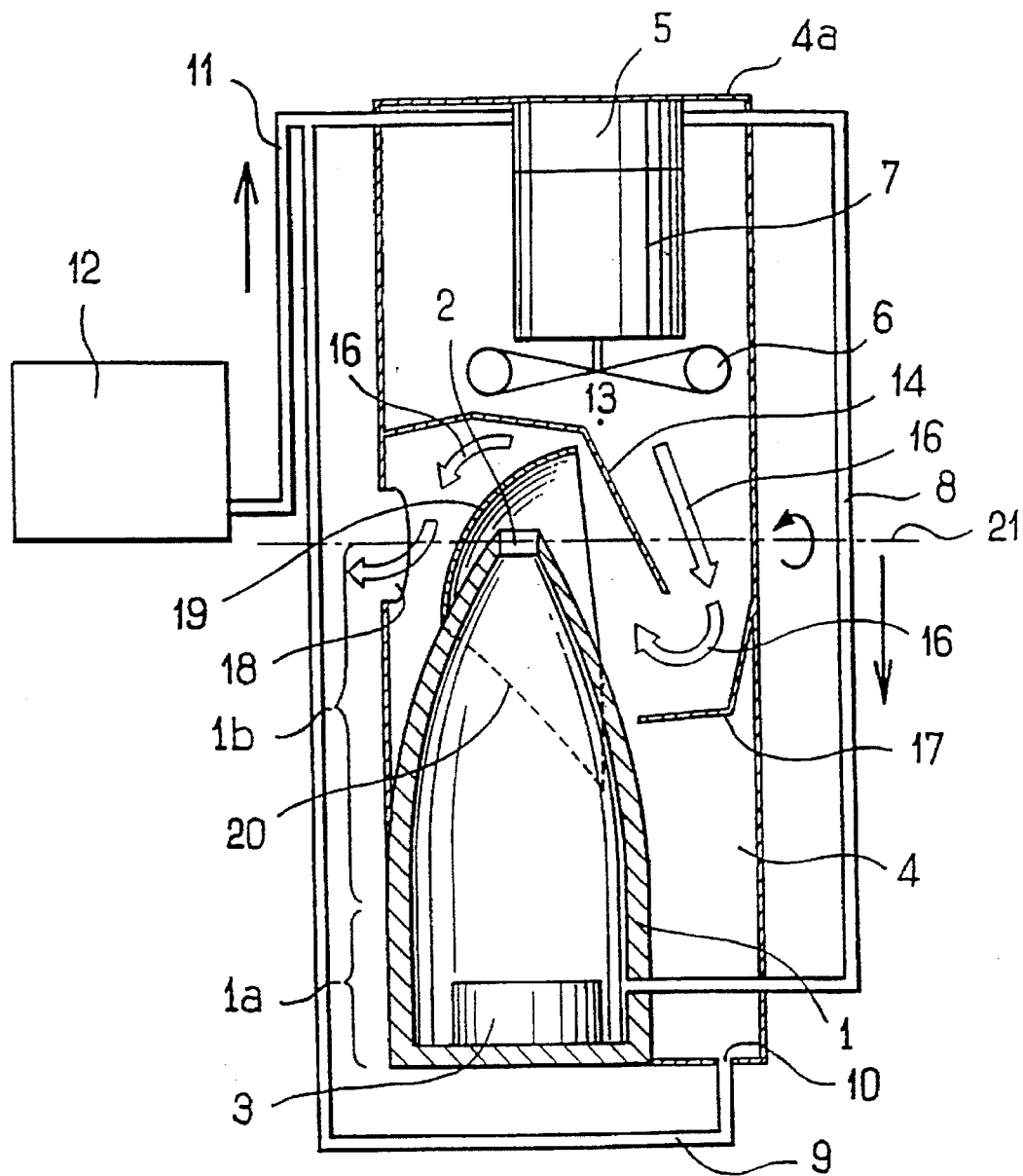
FIG_2
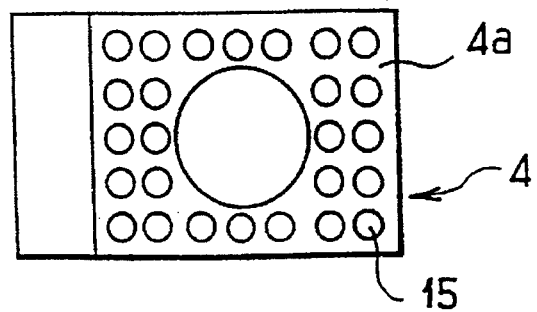

DEVICE FOR SPRAYING, IN PARTICULAR WATER IN THE FORM OF MICRODROPLETS, CAPABLE OF FUNCTIONING IN A NONSTATIONARY ENVIRONMENT

BACKGROUND OF THE INVENTION

The present invention relates to a device for spraying, in particular water in the form of microdroplets, capable of functioning in a non-stationary environment, in particular in a vehicle.

It is known to use water microspray devices for humidifying ambient air in a room of a building.

Such devices are thus known which include a ceramic piezoelectric transducer excited by a high-frequency current and emitting ultrasound waves into a small immobile tank filled with water.

The waves are focused at a point close to the surface of the water, where a liquid jet, which is called an "acoustic fountain" and which is surrounded by a mist of microdroplets, is formed. An air current created in the vicinity of the liquid jet then removes the microdroplets to the outside of the device, into the ambient air.

Such a device can operate suitably only if it is kept in a preferential orientation and is not subjected to any significant acceleration.

In the contrary case, for example if the device in housed in the passenger compartment of a motor vehicle, it is subjected to accelerations due to the movements of the vehicle, which disturbs the formation of the acoustic fountain and may lead to spillage of water from its tank.

SUMMARY OF THE INVENTION

The present invention aims to provide a spraying device which is capable of functioning not only in a stable position but also when it is subjected to various kinds of accelerations.

The subject of the present invention is a spraying device including a tank which is open at its upper part, capable of containing a liquid to be sprayed, such as water, while being filled up to its opening, a piezoelectric element capable of emitting waves into the liquid and fan means for creating a circulation of air in the vicinity of the surface of the liquid, wherein the waves are focused in the vicinity of the opening of the tank, and wherein the cross-section of the tank has a progressive constriction towards the opening of the said tank.

By virtue of this cross-sectional constriction, the liquid contained in the tank is insensitive to accelerations of the environment in which the device according to the invention is installed.

By way of example, the device according to the invention may be fitted on board a motor vehicle, a boat or an aircraft.

In a particular embodiment of the invention, the walls of the tank are made of a hard material capable of reflecting the waves, and are designed so as to focus the waves at a point located in the vicinity of the central part of the opening of the tank.

Thus, the walls of the tank fulfil two separate functions, namely limitation of the risk of overspill of liquid from the tank, on the one hand, and focusing of the waves in the vicinity of the central part of the opening of the tank, on the other hand.

In a particular embodiment of the invention, the device includes a collection container, in which the tank is placed, a pump connected, on the one hand, to the collection container and, on the other hand, to the tank and capable of circulating the liquid continuously between the tank from which it overspills and the collection container where it is collected, and a liquid reservoir also connected to the pump, for keeping the quantity of liquid circulating in the device constant.

Thus, the instability in the level of the liquid at the opening of the tank, which might result from unforeseeable overspills due to high accelerations to which the device is subjected, is for the most part compensated by the fact that, since the liquid overspills continuously and in forced fashion at the opening of the tank, even high accelerations cannot cause more than a slight fluctuation in the quantity of liquid which overspills, without substantially altering the level of the liquid at the opening of the tank.

In addition, not only is such a device insensitive to accelerations, but it is furthermore insensitive to slight inclination variations.

The flow rate of the pump is advantageously sufficiently high to generate a liquid jet at the opening of the tank, independently of the acoustic fountain which results from the action of the ultrasound waves alone.

In this way, the energy of the waves can be employed principally for spraying the liquid, formation of the acoustic fountain being facilitated by the fact that the liquid jet is already created by the pump.

In order to improve the spraying efficiency further, it is preferable according to the invention to choose the diameter of the opening of the tank to be close to that of the acoustic fountain which would be formed naturally by the waves in the absence of a pump, so as to superpose optimally the water jet formed by the pump and the acoustic fountain generated by the waves.

Advantageously, a deflector is provided in extension of the opening of the tank, in order to retain the coarse drops of liquid which are thus recovered in the collection container, whereas the air current generated by the fan means removes the microdroplets towards the outside of the device.

With the aim of explaining the invention better, a description will now be give of an embodiment, given by way of non-limiting example with reference to the attached drawing, in which:

BRIEF DESCRIPTION OF THE INVENTION

FIG. 1 is a schematic view in elevation and in section of one embodiment of the device according to the invention, and FIG. 2 is a plan view of FIG. 1.

DETAILED DESCRIPTION OF THE INVENTION

The device represented in the drawing comprises an axisymmetric tank 1 which includes a cylindrical base 1a and an upper part 1b, the section of which narrows towards an opening 2.

The tank 1 is intended to contain water.

A piezoelectric transducer, of cylindrical shape and consisting of a ceramic 3, is placed inside the tank 1, against its bottom wall.

The ceramic 3 can emit ultrasound waves into the water contained in the tank, towards the opening 2.

The walls of the tank are made, for example, of stainless steel, a material which is sufficiently hard to reflect the waves while absorbing a minimal amount of energy.

The converging shape of the walls of the tank 1 is determined so as to focus the waves in the central part of the opening 2.

The tank 1 is housed inside a closed container 4 which constitutes a collection container in the sense of the invention.

A pump 5 and a fan 6, which are driven by a common motor 7, are arranged inside this collection container 4.

The pump 5 is connected, on the one hand, to the tank 1 via a first conduit 8 and, on the other hand, to the collection container 4 via a second conduit 9, the mouth 10 of which is located at the bottom of the said collection container 4.

The pump 5 is also connected, via a third conduit 11, to a water reservoir 12.

The fan 6, as well as moreover the pump 5 for reasons of space saving, are housed in a compartment 13 of the collection container 4. This compartment 13 is bounded by an end wall 4a of the collection container 4 and by a leaktight internal partition 14.

As shown by FIG. 2, the end wall 4a includes orifices 15 in its part corresponding to the compartment 13.

These orifices 15 allow admission of air originating from the outside under the effect of the fan 6, which creates a circulation of air in the collection container, as represented by the arrows 16.

The path of the air current thus created is determined by a deflector 17 and by the partition 14, the face of which opposite the compartment 13 forms a deflector.

An orifice 18 made in the collection container 4 opens to the outside and allows air to escape.

The end part of the tank 1 is enclosed in a deflector 19 of spherical cap shape, having an axis substantially perpendicular to the longitudinal axis of the tank 1, the concavity of which is turned towards the deflector 17 and away from the orifice 18.

The cap 19 is secured to the outer wall of the tank 1 along a leaktight seal 20.

A description will now be given of the operation of the spraying device represented in the drawing.

In order to facilitate the explanation, it will be assumed that the orientation of the device is vertical, as represented in FIG. 1.

The tank 1 is filled with water.

The pump 5 delivers water via the conduit 8, so that a water jet is formed at the opening of the tank.

The water is recovered by the collection container 4 and recirculated by the pump 5 via the conduit 9.

The ceramic 3 emits waves which propagate through the water in a plane perpendicular to the longitudinal axis of the tank.

The convergent shape of the walls of the tank 1 focuses the waves at a point located in the central part of the opening 2.

This concentration of the energy of the waves in the vicinity of the surface of the water allows the formation of a mist of microdroplets surrounding the water jet.

In a preferred mode, these microdroplets have a diameter of less than 5 microns and are conveyed outwards by the air current formed by the fan 6.

Other, heavier drops are formed and are recovered via the spherical cap 19 and fall under gravity to the bottom of the collection container 4, to be recirculated by the pump 5 in the same way as the unsprayed water originating from the water jet.

The diameter of the opening 2 is chosen so that the water jet formed by the pump 5 is substantially the same as the acoustic fountain which would be generated only by the waves omitted by the ceramic 3.

The energy of the waves which is not used to form this acoustic fountain thus serves principally for spraying water.

In other words, the efficiency of the spraying is increased by the fact that the energy of the waves is used for the most part to spray water, the water jet being already formed by the pump.

By virtue of the various deflectors and the spherical cap 19, it is possible to operate the device described in all positions which may result from an 85° pivoting of this device about an axis 21, perpendicularly to the longitudinal axis of the tank 1 and contained in the plane of the drawing.

In other words, the device can function while being inclined by a minimum angle of 5 degrees with respect to the horizontal.

The water reservoir 12 allows the pump 5 to keep the quantity of water circulating in the device constant, compensating for the volume of water removed outwards by the microspraying.

It is clear that this device, the overall dimensions of which are of the order of 4 cm in diameter and 10 cm in length, can be installed easily in a vehicle.

The fact that it is capable of operating suitably while being inclined by a minimum angle of 5 degrees with respect to the horizontal allows convenient use in all sorts of vehicles.

For example, the device according to the invention can be installed in the passenger compartment of a motor vehicle, with its longitudinal axis inclined by 10 degrees with respect to the horizontal, this giving it a vertical bulk of approximately 5.7 cm which makes it possible, for example, to house it in the roof of the passenger compartment.

The device according to the invention can also be fitted on board an aircraft or a boat, where the stability conditions are, a priori, not very good.

It is clear that the embodiment which has just been describes exhibits no limiting nature and that it may receive any desirable modifications without thereby departing from the scope of the invention.

We claim:

1. A spraying device comprising:

a tank that has an opening at an upper part thereof, the tank being configured to contain a liquid to be sprayed while being filled up to the opening and wherein the cross-section of the tank has a progressive constriction toward the opening;

a piezoelectric element configured to emit waves into the liquid, the waves being focused adjacent the opening of the tank;

a fan configured to circulate air in the vicinity of the surface of the liquid;

a collection container in which the tank is located;

a pump connected to the collection container and to the tank and configured to circulate liquid continuously between the tank from which the liquid overspills and the collection container where the liquid is collected; and a liquid reservoir connected to the pump for keeping a quantity of liquid circulating in the spraying device substantially constant.

2. A device according to claim 1, wherein walls of the tank are made of a hard material configured to reflect the waves and to focus the waves at a point located in the vicinity of a central part of the opening of the tank.

3. A device according to claim 1, wherein the opening of the tank is dimensioned to substantially correspond to an acoustic fountain that would be formed naturally by the waves in the absence of a pump.

4. A device according to claim 1, further comprising a deflector extending adjacent the opening of the tank in order to retain coarse drops of liquid which are recovered in the collection container.

* * * * *